(12) United States Patent
Shew

(10) Patent No.: US 10,281,188 B2
(45) Date of Patent: May 7, 2019

(54) ICE COOLER

(71) Applicant: Larry N. Shew, White Lake, MI (US)

(72) Inventor: Larry N. Shew, White Lake, MI (US)

( * ) Notice: Subject to any disclaimer, the term of this patent is extended or adjusted under 35 U.S.C. 154(b) by 0 days.

(21) Appl. No.: 15/271,793

(22) Filed: Sep. 21, 2016

(65) Prior Publication Data

US 2017/0082341 A1 Mar. 23, 2017

Related U.S. Application Data (60) Provisional application No. 62/221,801, filed on Sep. 22, 2015.

(51) Int. Cl.
| F25D 3/06 | (2006.01) |
| F25D 17/06 | (2006.01) |
| F25D 23/02 | (2006.01) |

(52) U.S. Cl.
CPC ............... *F25D 3/06* (2013.01); *F25D 17/06* (2013.01); *F25D 23/026* (2013.01); *F25D 23/028* (2013.01); *F25D 2303/0832* (2013.01); *F25D 2317/0665* (2013.01)

(58) Field of Classification Search
CPC ........... F25D 11/006; F25D 2303/0832; F25D 2303/08221; F25D 2303/0845
See application file for complete search history.

(56) References Cited

U.S. PATENT DOCUMENTS

| 3,678,703 | A | * | 7/1972 | Cornish | ............ | A47J 41/0044 |
| | | | | | | 62/371 |
| 4,351,165 | A | | 9/1982 | Gottsegen et al. | | |
| 5,329,787 | A | | 7/1994 | Friday | | |
| 5,509,279 | A | | 4/1996 | Brown et al. | | |
| 5,598,943 | A | | 2/1997 | Markus | | |
| 6,119,476 | A | * | 9/2000 | Slaughter | ............... | A01K 63/02 |
| | | | | | | 62/371 |
| 6,295,830 | B1 | * | 10/2001 | Newman | ............ | B65D 81/3823 |
| | | | | | | 62/371 |
| 6,349,559 | B1 | | 2/2002 | Hasanovic | | |
| 2008/0127668 | A1 | * | 6/2008 | DeVito | ............ | F25D 3/08 |
| | | | | | | 62/371 |
| 2008/0307824 | A1 | * | 12/2008 | Botich | ............ | F25D 3/08 |
| | | | | | | 62/457.2 |
| 2011/0259898 | A1 | | 10/2011 | Mogil et al. | | |
| 2015/0166244 | A1 | * | 6/2015 | Wood | ............ | B65D 81/18 |
| | | | | | | 220/592.25 |

FOREIGN PATENT DOCUMENTS

EP 0765819 2/1997

* cited by examiner

*Primary Examiner* — Cassey D Bauer
(74) *Attorney, Agent, or Firm* — L.C. Begin & Associates, PLLC (57) ABSTRACT

A cooler device is disclosed with a removable cooling element. The cooler device includes a cooler lower assembly including a cooling cavity configured to contain food placed within cooling cavity, the cooling cavity comprising side walls and a floor wall, wherein one wall of the side walls and the floor wall comprises a wall cavity. The cooler device additionally includes a lid configured to seal the cooling cavity and the removable cooling element configured to selectively be removed from the cooler device for placement within a powered refrigeration device and to selectively affixingly fit within the wall cavity and provide cooling to the cooling cavity.

12 Claims, 8 Drawing Sheets

ICE COOLER

CROSS REFERENCE TO RELATED APPLICATIONS

This disclosure claims the benefit of U.S. Provisional Application No. 62/221,801 filed on Sep. 22, 2015 which is hereby incorporated by reference.

TECHNICAL FIELD

The present disclosure relates generally to a cooler device and a cooling element that would be used to keep food and beverages at a colder temperature than the surrounding outside ambient temperature. In particular, the present disclosure relates to a cooler device including a removable cooling element that can be affixed within a cooling element cavity in a wall of the ice cooler, such that a substantially rectangular cooling cavity for receiving food or drinks is presented to a user.

BACKGROUND

The statements in this section merely provide background information related to the present disclosure. Accordingly, such statements are not intended to constitute an admission of prior art.

The ice chest cooler was first introduced in the early 1950's. Ice coolers or cooler devices are available in almost every size, shape and color. Some coolers have handles and wheels to help make transporting the cooler easier. Another feature that most coolers have in common is a drain at the bottom of the cooler to help drain the water from the melting ice.

Ice cubes, dry ice and ice packs are used to keep food and drinks cold within a cooler device. Coolers today incorporate more and better insulation to help slow down the ice from melting within the cooler. Add-on features like Bluetooth® speakers for music and USB charger to charge your cell phone are offered as enhancing features.

A problem with using ice cubes or ice packs as the means to keep food and drinks cold is the amount of interior space that ice cubes and ice packs take up within the cooler. A typical cooler is designed with a large single cooling cavity to hold the beverages, food, and other objects to be kept cold. Ice cubes or other similar cooling elements take up as much as 20% to 40% of the interior space within the cooler which reduces the amount of available space for food and drinks.

A second problem when using ice cubes is the watery mess created when the ice cube melts. The cooler device typically ends up filled with water, making it more difficult to keep food dry. Using ice cubes requires constant draining of the melted water.

A third problem is the time and effort required to create the ice cubes for the cooler. Water spills normally happen when filling and placing the ice cubes trays within the freezer. Removing the ice cubes from the ice trays can be difficult when the ice cubes won't come out of the tray. Another common problem is keeping the food cold. The temperature generated by using ice cubes is 32-38 degrees. Keeping the beverages cold is easy because the drinks can be placed directly in between the ice cubes. Placing food within the ice cubes can result in wet food. However, temperature stratification within the cooler can be problematic, with food suspended over the ice cubes not being kept as cold as desired. Cold temperature generated by the ice cubes remains within 1-2 inches above the ice cubes.

SUMMARY

A cooler device is disclosed with a removable cooling element. The cooler device includes a cooler lower assembly including a cooling cavity configured to contain food placed within cooling cavity, the cooling cavity comprising side walls and a floor wall, wherein one wall of the side walls and the floor wall comprises a wall cavity. The cooler device additionally includes a lid configured to seal the cooling cavity and the removable cooling element configured to selectively be removed from the cooler device for placement within a powered refrigeration device and to selectively affixingly fit within the wall cavity and provide cooling to the cooling cavity.

BRIEF DESCRIPTION OF THE DRAWINGS

One or more embodiments will now be described, by way of example, with reference to the accompanying drawings, in which.

DETAILED DESCRIPTION

A cooler device is disclosed including a removable cooling element that can be affixed within a cooling element cavity entirely within a wall of the ice cooler, such that an empty, substantially rectangular cooling cavity for receiving food or drinks is presented to a user. By locating the cooling element entirely within a wall of the cooler device, the empty cooling cavity can be used entirely to contain food and/or drink products, with the cooling element absorbing heat from the cooling cavity and keeping the food and drink products cold. The disclosed cooler device includes cooling elements installed to the walls of the cooling device, such that a cooling cavity of the cooler device is defined by the thickness of the walls of the cooler.

The elimination of ice cubes and ice packs within the cooling cavity of the cooler device will create more space inside the cooler for the storing of food and beverages. A substantially rectangular cooling cavity within a cooler device includes four side walls and one bottom wall or floor wall. A cooling element according to the present disclosure can be located within any one of the side walls or the floor wall. Two cooling elements according to the disclosure can be located within any two of the side walls or the floor wall. Any number of cooling elements can be located in any or all of the side walls and the floor wall.

According to one embodiment, the cooling element can include a surface that, once the cooling element is installed to the cooler device, becomes a wall of the cooling cavity. This surface of the cooling element acting as a wall of the cooling cavity can be advantageous, as the cold cooling element can be placed in direct contact with the food or drink to be chilled. In one embodiment, the wall of the cooling element to act as the wall of the cooling cavity can be made of aluminum or any other metal or other highly thermally conductive material can be used to facilitate heat transfer from the food or drink being chilled to a cold cell or cold mass within the cooling element. Such a cooling element can be held in place within the cooler device with a number of attachment mechanisms, such as tongue and groove structures, magnets, mechanical snaps, or any other similar mechanical attachment mechanism known in the art.

In another embodiment, a wall of the cooler device can include an opening panel, wherein opening the panel exposes a cavity within the wall of the cooler, the cooling element can be inserted within the cavity within the wall, and the opening panel can be closed. In such an embodiment, heat is transferred from one side of the opening panel to the other, from the cooling cavity to the cooling element contained by the opening panel.

The removable cooling elements, prior to use of the cooler device, can be taken out of the cooler device and placed in a freezer. Once the cooling elements have been chilled to a desired temperature, they can be removed from the freezer and placed within the cooler device. This process can be repeated as necessary. In another embodiment, a cooler device can be supplied with a plurality of matching cooling elements, such that a user can place one set of cooling elements within the cooler device, and once the cooling capacity of those elements is used up, a second set of cooling elements can be installed.

According to one embodiment of the present disclosure, one is provided with an ability to control the temperatures of exemplary drinking beverages within a metal can. A cooler device can include a cavity within a side wall and another cavity within a floor wall of the cooler device, and the device can be supplied with one cooling element and one inert cavity filling insert. One can control the temperature of the beverage by controlling contact between the cooling element and the drink container. The more surface contact area, the colder the temperature of the beverage. Making contact at the base of the can and a cooling element contained within the floor will result in a lower temperature than a can touching only a cooling element contained within one side wall. The difference can be as much as 8 degrees different. The more surface area of the cooling device that makes contact with the metal can of the drink will help lower the overall temperature of the drink.

By eliminating the need of ice cubes will result in to 35% or more interior space and provide the customer more room to fit food and beverages into the cooler. Additionally, the food will remain dry and cold without traditional watery mess from the melting ice cube.

A traditional ice pack used as the cooling device within a cooler to keep food and drinks cold is comprised of plastic on all sides. The problem with plastic is it is more of an insulator than a conductor. The traditional ice pack absorbs heat on all sides as the way to keep food and drinks cold. The problem of using ice packs within a cooler is the amount of valuable interior that is used up (as much as 40%). Our testing indicates the temperatures being created by an ice pack ranges from 28-38 degrees. The disclosed device provides a more consistent temperature within the cooling cavity, with the metal plate of the cooling element more efficiently absorbing heat from the cooling cavity.

As a rule ice cubes will use up at much as 40% of the interior space of a traditional cooler. Using a cooling device in a form of a "wall panels" will eliminate the need of ice cubes and ice packs and will help make the interior space larger for food and drinks while reducing the size of the outside cooler.

To help create balance temperatures at the top and bottom of the cooler, an optional embodiment of the disclosure includes a fan device located within a lid/top sealing mechanism of the cooler device. Such a fan can be battery powered or powered by solar panels. The fan mixes air within the cooling cavity and reduces temperature stratification within the cooling cavity.

Figure 1:
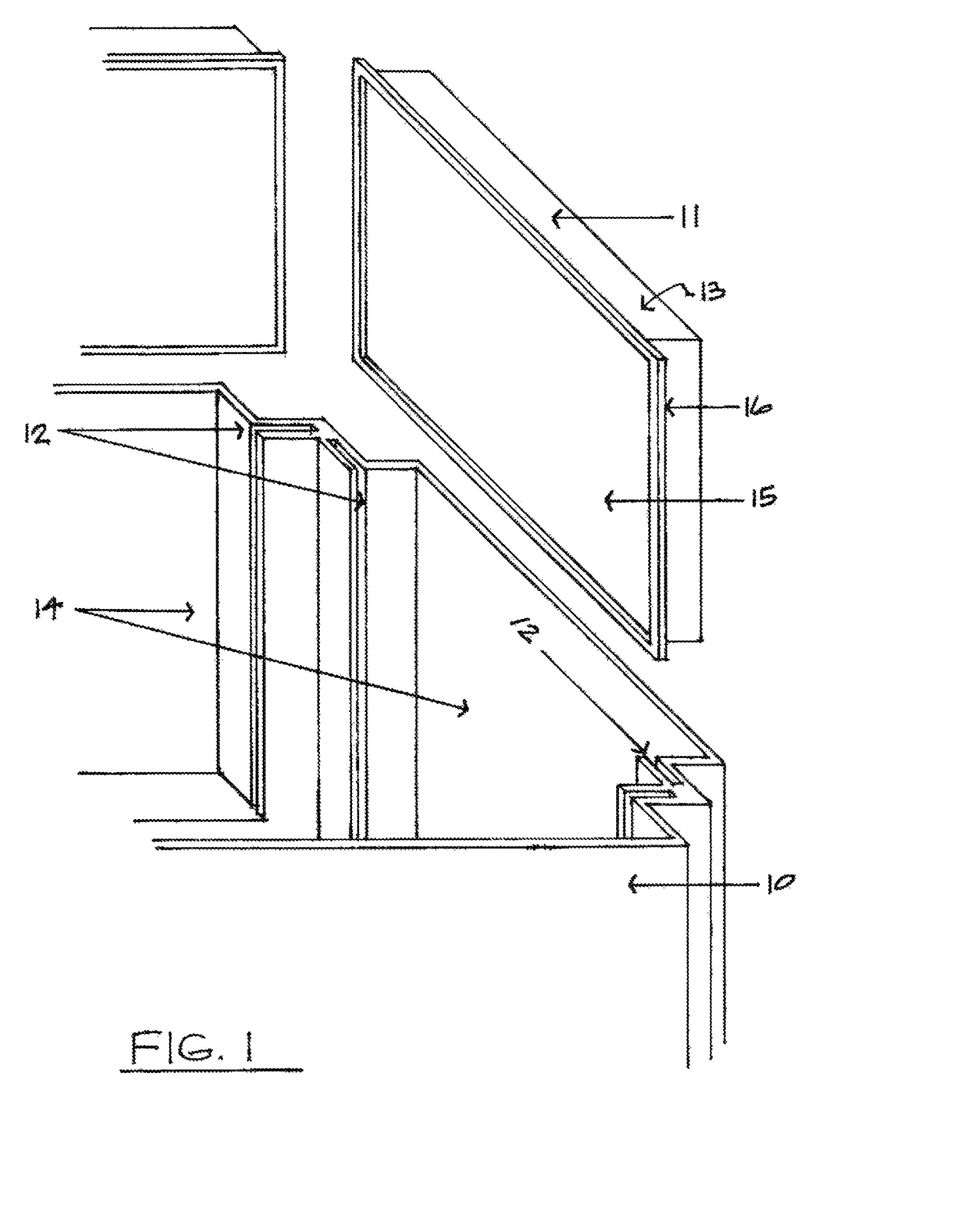
FIG. 1 illustrates a perspective view of an exemplary cooler device including a plurality of wall cavities and cooling elements configured to be installed to the wall cavities, in accordance with the present disclosure.

One or more embodiments will now be described, by way of example, with reference to the accompanying drawings, in which: FIG. 1 illustrates a perspective view of an exemplary cooler device. The cooler device includes housing 10 with grooves 12 for mating with the extending flanges 16 of the cooling element 11. Wall cavities 14 can be located on all four sides and floor of the housing a cooler. Housing 10 can include a molded plastic housing which is placed within a mating outer housing to create the cooler device.

Each cooling element 11 can include metal plate 15 as a means to efficiently promote heat transfer from the cooling cavity of the cooler device to the coolant element 11. Metal plate 15 can be substituted with any thermally conductive material promoting heat transfer through the plate. In another embodiment, the plate can be made of plastic or other material to reduce cost. The metal surface is bonded to exemplary plastic or rubber outer housing 13. The outer housing of the coolant device can include insulating material to minimize heat flow from areas outside of the cooling cavity of the cooler device into the cooling element. In one embodiment, plastic housing 13 can include glass fill known in the art, as glass fill used in plastics is known to decrease thermal conductivity of the plastic material.

Housing 11 and plate 13 create a cavity therebetween, in which is contained a diluted coolant solution or other material known in the art for use in a freezer pack.

Insulation known in the art, such as Styrofoam, can be placed between housing 10 and the mating outer housing of the cooler device to insulate the cooling element and the cooling cavity from heat transfer from the ambient area.

Figure 2:
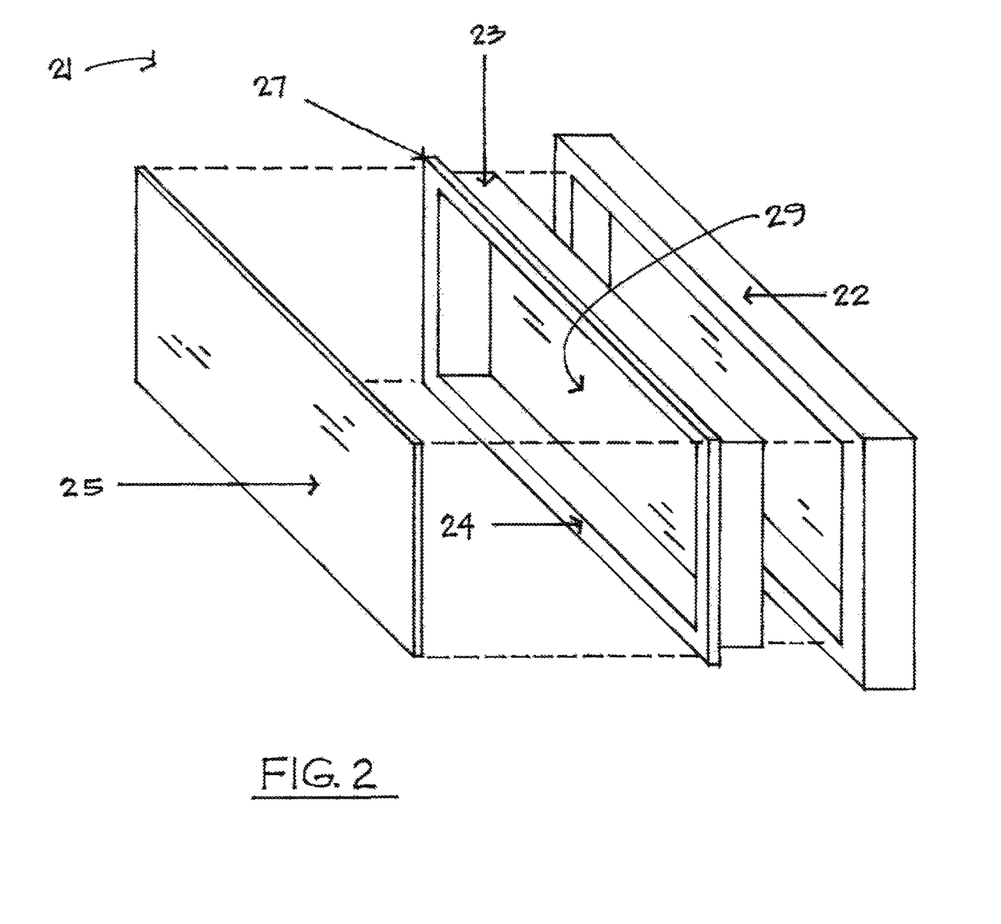
FIG. 2 illustrates an exploded view of an alternative exemplary embodiment of the cooling element of FIG. 1, in accordance with the present disclosure.

FIG. 2 illustrates an exploded view of an alternative exemplary embodiment of the cooling element of FIG. 1. Cooling element 21 includes housing 23 in a form of a box having four sides and a back. The box could be made from plastic or hard rubber. Thermally conductive plate 25 is illustrated aligned and ready for sealing installation to surface 24 of housing 23, thereby encapsulating cavity 29 between housing 23 and plate 25. Diluted coolant or any other similar freezer pack substance can be contained within cavity 29. This coolant can be poured in liquid form within cavity 29 prior to installation of plate 25. In another embodiment, the coolant material can be contained within a plastic bag or other intermediate container before installation to cavity 29 to prevent any leakage of the coolant material.

Housing 13 of FIG. 1 includes a plastic or rubber housing with insulating properties inherent to the material of the housing, such as including a glass fill material. Insulation case 22 of FIG. 2 instead includes known insulating material such as Styrofoam and covers five sides of housing 23 to reduce heat transfer through any side of cooling element 21 except through plate 25.

Surface 24 is configured to receive and be bonded to metal plate 25. Flange 27 can be configured to be received within a groove of a mating cooler device housing.

Figure 3:
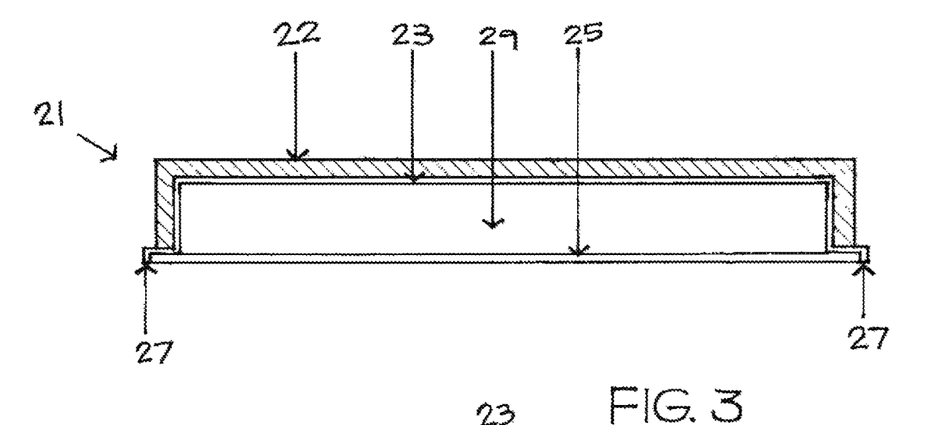
FIG. 3 and FIG. 4 illustrate the cooling element of FIG. 2 in cross sectional view, in accordance with the present disclosure.
Figure 4:
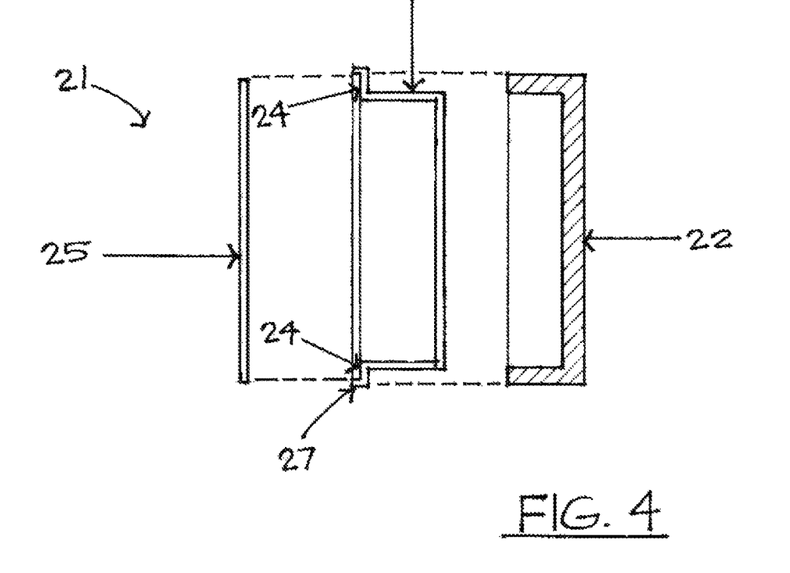

FIG. 3 and FIG. 4 illustrate a cross section through the cooling element of FIG. 2. FIG. 3 illustrates the cooling element of FIG. 2 viewed across a longer axis of the element. Cooling element 21 is illustrated including housing 23 bonded to plate 25, with cavity 29 formed therebetween. Flange 27 is provided for attachment to a mating groove in a housing of the cooler device. Insulation case 22 is illustrated surrounding the short sides and the long back surface of housing 23. FIG. 4 illustrates the cooling element of FIG. 2 viewed across a shorter axis of the element. Cooling element 21 is illustrated including housing 23. Plate 25 is illustrated aligned to surfaces 24 of housing 23. Flange 27 is provided for attachment to a mating groove in a housing of the cooler device. Insulation case 22 is illustrated aligned to and ready to be installed to housing 23.

Figure 5:
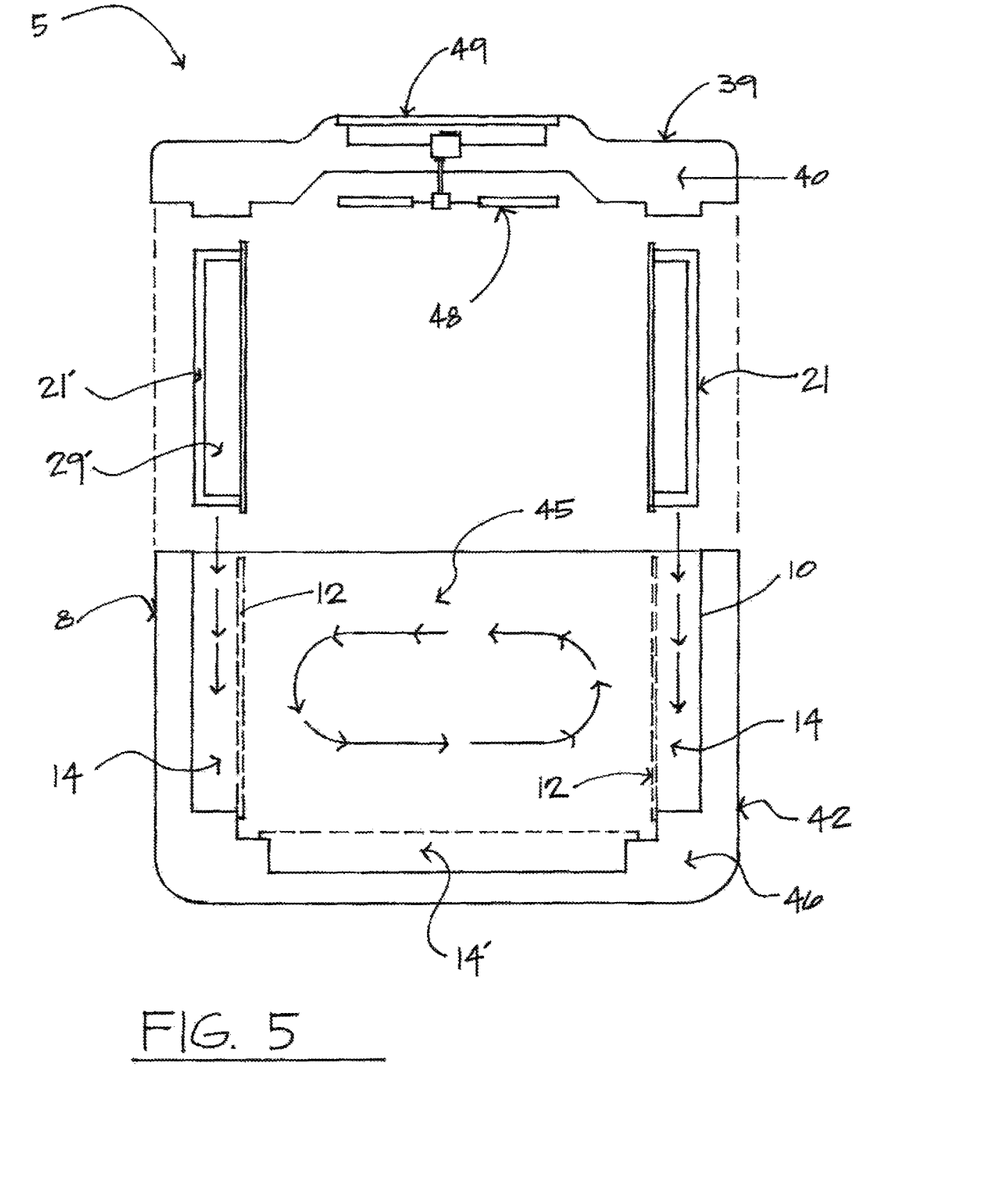
FIG. 5 illustrates an exemplary cooler device including at least one cooling element and an optional lid fan, in accordance with the present disclosure.

FIG. 5 illustrates an exemplary cooler device including at least one cooling element and an optional lid fan. Cooler device 5 is illustrated in cross-section. Lower cooler assembly 8 includes housing 10 including cavities 14 in two side walls and cavity 14' in the floor wall. Cavities 14 include grooves 12 configured to receive mating flanges upon cooling element 21. Cavity 14', being in a floor wall of lower cooler assembly 8, need not include grooves, such that a second cooling element 21 can be simply laid in cavity 14' with gravity holding the second cooling element 21 in place. In another embodiment, snap tabs known in the art could be used to hold the second cooling element 21 in cavity 14' until the snap tabs were activated to remove the element.

Cooling element 21 of FIG. 2 is illustrated in FIG. 5 aligned and ready to be inserted into grooves 12 of housing 10. An inert cooling element 21' is additionally illustrated, for example, enabling control of temperatures of drink cans within cooling cavity 45, as disclosed herein. Inert cooling element 21' can be hollow or can include insulation 29' increasing the overall insulation of cooler device 5. Inert cooling element 21' can be easily replaced with another cooling element 21.

Lower cooler assembly 8 further includes an outer housing 42 connected to housing 10 and including insulating material 46 contained therebetween.

Lid 39 is illustrated configured to be set upon lower cooler assembly 8 and seal cooler device 5. Lid 39 includes insulation 40. In an optional construction, lid 39 is illustrated including fan 48 including a direct current electrical motor powered by an exemplary solar panel 49. Fan 48, when powered, spins blade which move air around within cooling cavity 45, thereby reducing temperature stratification within the cooling cavity. Solar panel 49 can be replaced with a battery pack utilizing known exemplary AA or 9 volt batteries.

Figure 6:
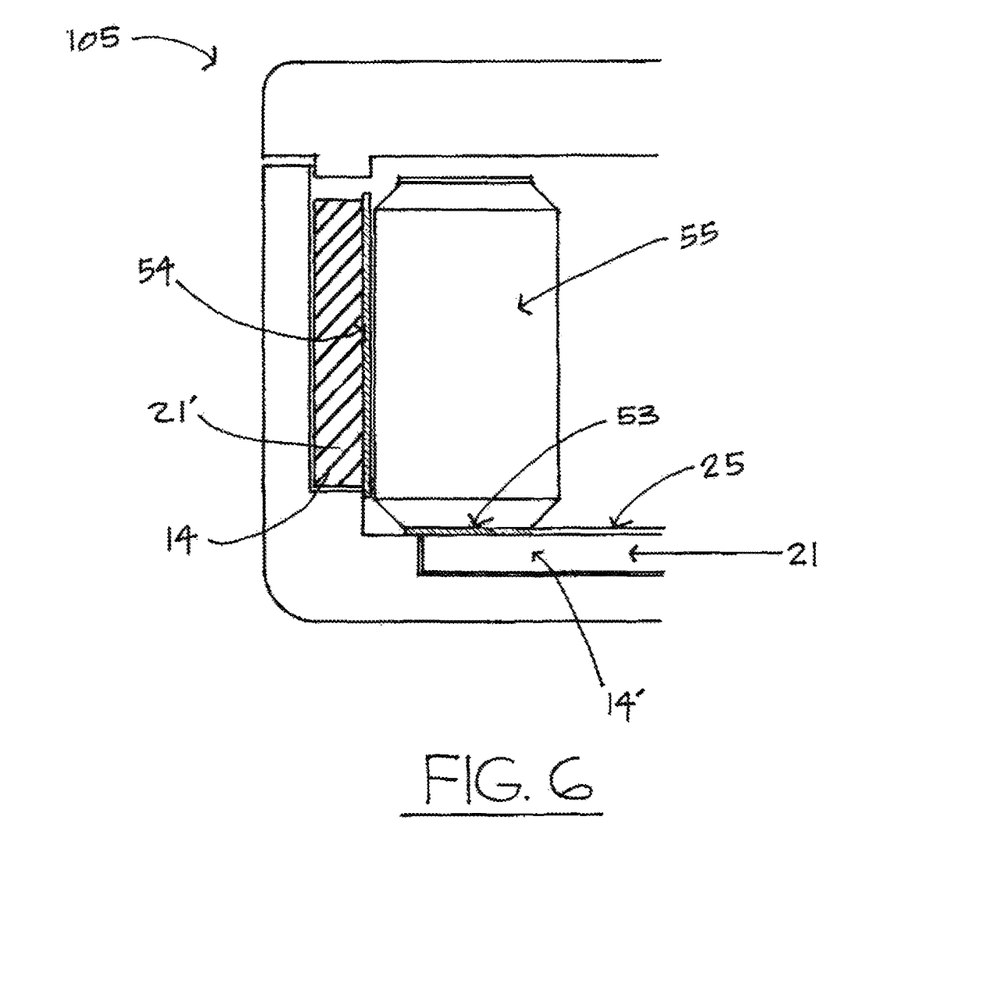
FIG. 6 illustrated an exemplary drink can within a cooler device with selective use of a cooling element and an inert cooling element to control temperature of the drink can, in accordance with the present disclosure.

FIG. 6 illustrated an exemplary drink can within a cooler device with selective use of a cooling element and an inert cooling element to control temperature of the drink can. Cooler device 105 is illustrated. Cooling element 21 including metal plate 25 is installed to wall cavity 14' in the floor wall, and inert cooling element 21' is inserted within cavity 14 in the side wall. Drink can 55 contacts cooling element 21 along bottom surface 53 of can 55, and can 55 contacts inert cooling element 21' along side surface 54 of can 55. Cooling element 21 and inert cooling element 21' can be the same size, so a user can choose in which wall surface he or she wants to put the cooling element 21, thereby controlling how cold the drink can gets. Instead of using flange and groove configurations to hold cooling elements in place within wall cavities, other mechanical or magnetic mechanisms can be used to hold the cooling elements in place.

Figure 7:
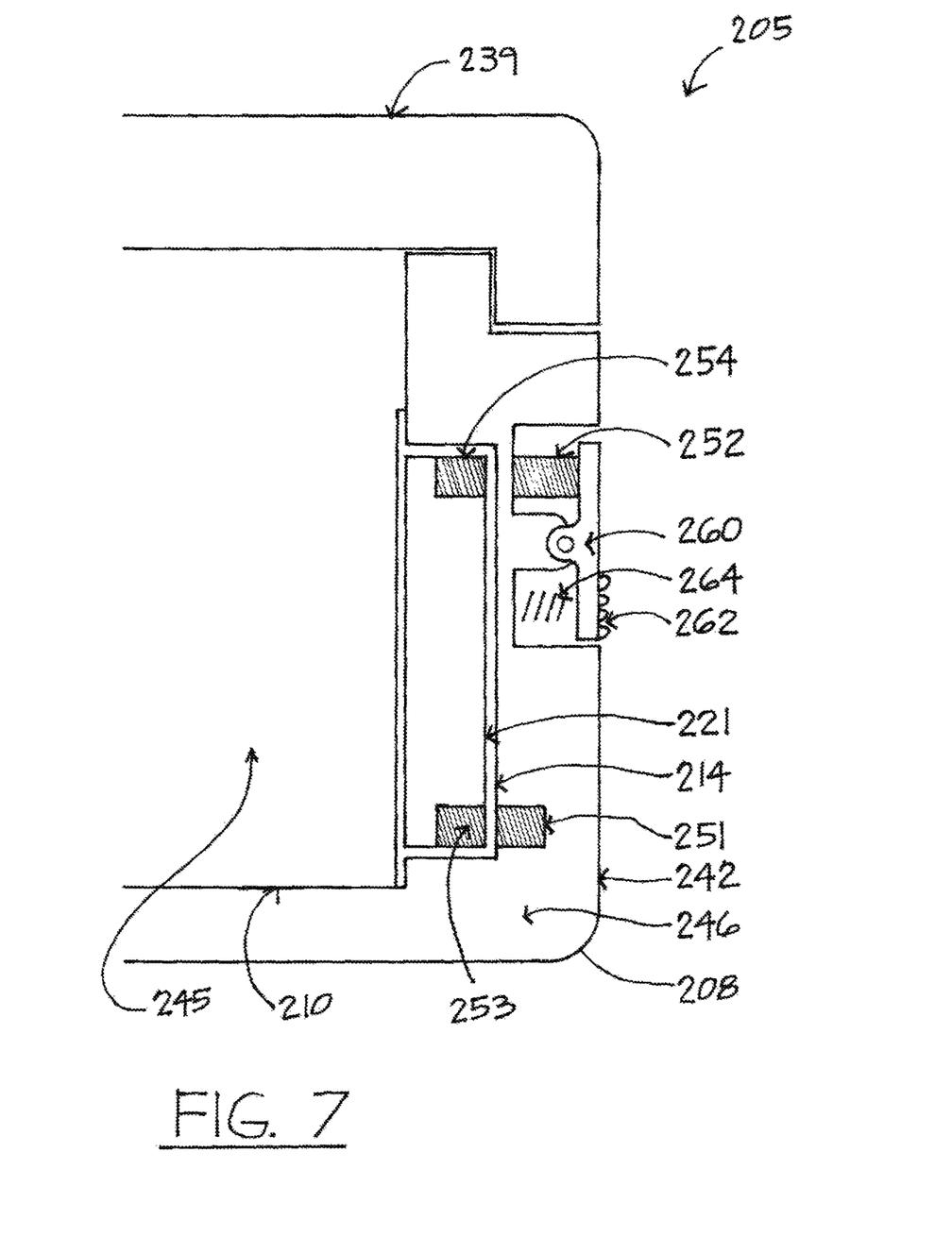
FIG. 7 illustrates exemplary magnetic mechanisms holding a cooling element within a wall cavity of a cooler device, in accordance with the present disclosure.

FIG. 7 illustrates exemplary magnetic mechanisms holding a cooling element within a wall cavity of a cooler device. Cooler device 205 is illustrated including lower cooler assembly 208 and lid 239. Lower cooler assembly including housing 210, insulation 246, and outer housing 242. Cooling element 221 is illustrated installed to a wall cavity 214 of housing 210. Cooling element 221 includes magnets 253 and 254 encapsulated therewithin. Housing 210 includes a magnet 251 located to mate and attract magnet 253. Housing 242 includes a rocker mechanism 260 which selectively permits a magnet 252 to be close to and attract magnet 254 or to be moved distant from and release magnet 254. Spring 264 biases mechanism 260 to keep magnet 252 close to magnet 254. By depressing button 262, a user can move magnet 252 away from magnet 254, thereby making it significantly easier for the user to remove cooling element 221 from cavity 214. When installed to cavity 214, cooling element 221 provides cooling to cooling cavity 245 while permitting the user full use of the substantially rectangular cooling cavity within the walls of the cooler device.

Figure 8:
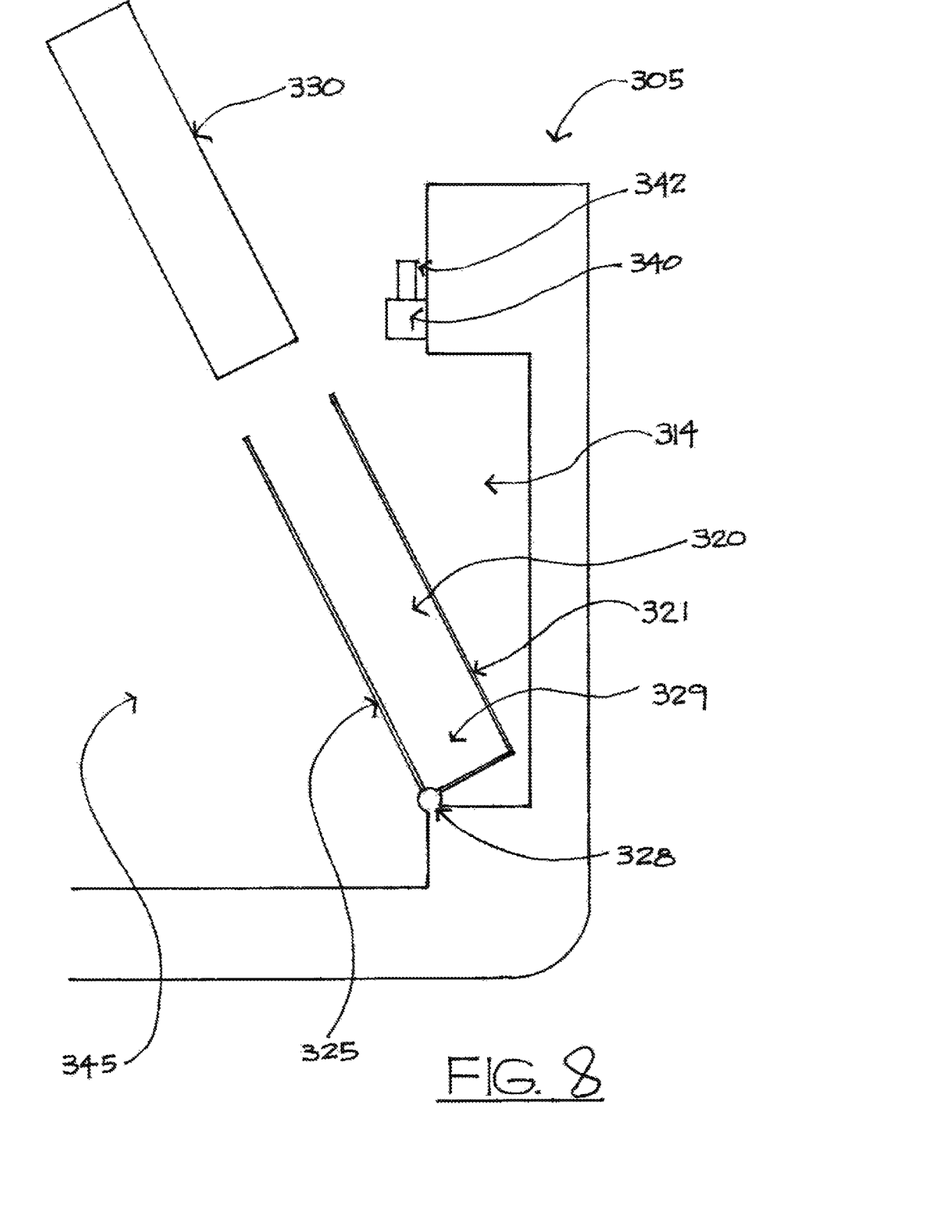
FIG. 8 illustrates an alternative exemplary embodiment of a cooler device including a cooling element inserted within a wall cavity of the cooler device, in accordance with the present disclosure.

FIG. 8 illustrates an alternative exemplary embodiment of a cooler device including a cooling element inserted within a wall cavity of the cooler device. Cooler device 305 is illustrated including a lower cooler assembly including a wall cavity 314. Hinged opening panel 325 is illustrated, hinged at hinge 328, which can open or close. Panel 325 is illustrated in an open state, ready to receive a cooling element 330, in this exemplary embodiment, including a freezer pack with an plastic casing. Panel 325 can be just a plain panel, selectively closing a cavity defined by wall cavity 314. In the exemplary embodiment of FIG. 8, panel 325 includes a hinged pocket door 320 with a back wall 321, with panel 325 and back wall 321 together defining cold pack cavity 329 into which cooling element 330 can be installed. Rotating latch 340 including retaining prong 342 are shown, where latch 340 can be rotated with prong 342 pointing downward as an exemplary way to retain panel 325 in a closed state. Once panel 325 is in a closed state, cooling cavity 345 in a substantially rectangular shape defined by the thickness of the walls of the cooler device is created. Panel 325 can be constructed of metal or other thermally conductive material to facilitate heat flow from the cooling cavity 345 to the cooling element 330 in accordance with the disclosure.

Figure 9:
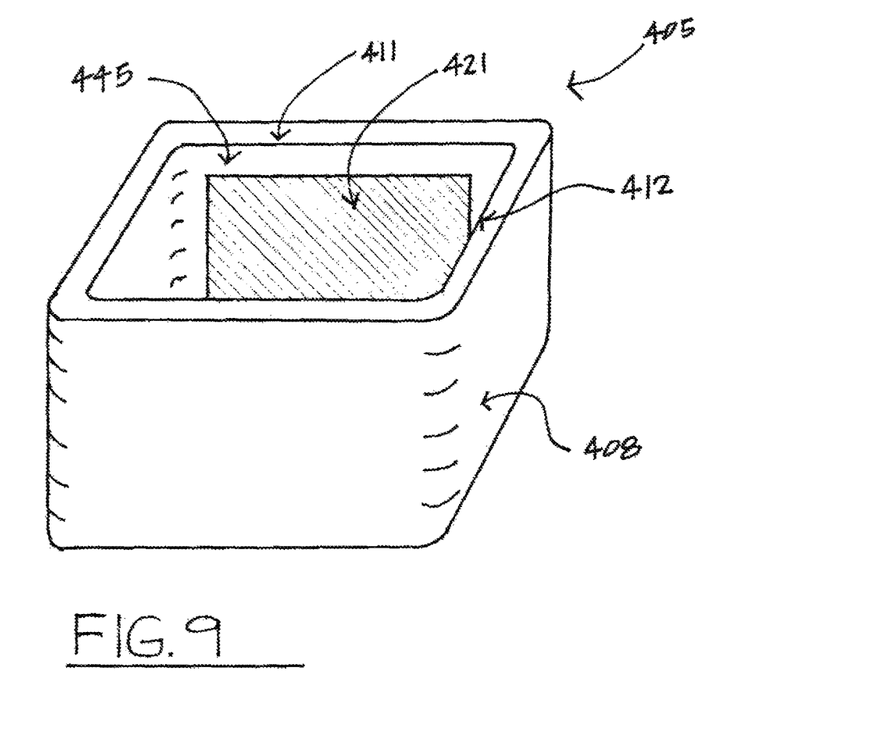
FIG. 9 illustrates in perspective view an exemplary cooler device with a cooling element installed to a wall cavity of the device, in accordance with the present disclosure.

FIG. 9 illustrates in perspective view an exemplary cooler device with a cooling element installed to a wall cavity of the device. Cooler device 405 is illustrated, including a lower cooler assembly 408 including cooling element 421 installed thereto. Cooling cavity 445 is illustrated into which food or drink products can be placed. Cavity 445 is defined by inner wall surface 411 and inner wall surface 412. Cooling element 421 is installed within a cavity in inner wall surface 411 and includes a surface that is flat with inner wall surface 411, such that cooling element 421 enables cavity 445 to remain defined by wall surfaces 411 and 412.

Figure 10:
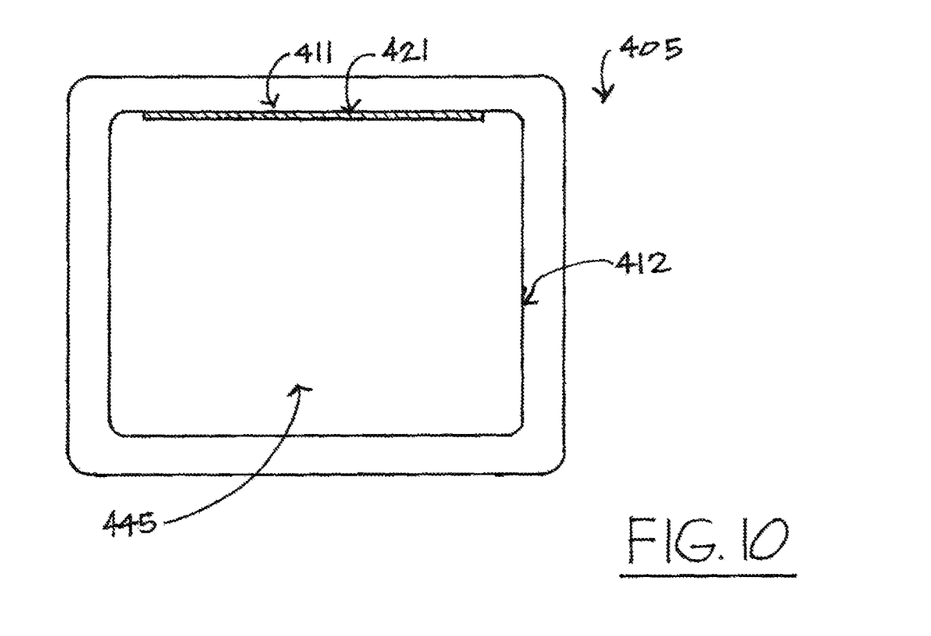
FIG. 10 illustrates the cooler device of FIG. 9 from a top view, in accordance with the present disclosure.

FIG. 10 illustrates the cooler device of FIG. 9 from a top view. Cooler device 405 is illustrated including substantially rectangular cooling cavity 445 defined by inner wall surface 411 and inner wall surface 412. Cooling element 421 is installed to a wall cavity within wall 411. Cooling element 421 can be configured to substantially flush with wall surface 411. In the embodiment of FIG. 10, the cooling element 421 stands off of wall surface 411 by a wall thickness, for example, as defined by a typical wall thickness of an injection molded plastic part (2 mm-5 mm typical.) Such a stand off can make it easier for a user to remove the cooling element than if the cooling element were flush with wall surface 411.

A number of different cooling element configurations, attachment configurations, and cooler device shapes and sizes are envisioned, and the disclosure is not intended to be limited to the exemplary embodiments provided herein.

A number of different cooler configurations are envisioned. According to one embodiment, the cooler device includes a cooler lower assembly including a cooling cavity configured to contain food placed within cooling cavity, the cooling cavity comprising side walls and a floor wall, wherein one wall of the side walls and the floor wall comprises a wall cavity. The cooler device additionally includes a lid configured to seal the cooling cavity and the removable cooling element configured to selectively be removed from the cooler device for placement within a powered refrigeration device and to selectively affixingly fit within the wall cavity and provide cooling to the cooling cavity.

The wall cavity can be formed in one of the side walls. The wall cavity can be formed in the floor wall. The cooler can include a plurality of removable cooling elements, each configured to affixingly fit within a matching wall cavity in one of the side walls and the floor wall.

The cooling cavity can include any number of walls in different shapes. The cooling cavity can be rectangular and include four side walls. The cooler can include five removable cooling elements, each configured to affixingly fit within a matching wall cavity in the side walls and the floor wall.

The removable cooling element can include a metal plate wall portion configured to be exposed to the cooling cavity when the removable cooling element is affixed within the wall cavity. This can maximize heat transfer between the cooling element and food within the cooling cavity. The removable cooling element further comprises insulation covering at least one side of the removable cooling element to prevent heat transfer between the cooling element and ambient air outside the cooler device.

A first one of the removable cooling element and the cooler assembly can include a groove and a second one of the removable cooling element and the cooler lower assembly can include a flange, wherein a combination of the flange and the groove affix the removable cooling element within the wall cavity.

The removable cooling element can include a first magnet and the cooler lower assembly can include a second magnet, wherein a combination of the first magnet and the second magnet affix the removable cooling element within the wall cavity. The cooler lower assembly can include a button mechanism, such as a pivoted arm configured to mechanically move the second magnet away from the first magnet and make the removable cooling element easier to remove.

The removable cooling element can include a flat wall exposed to the cooling cavity, wherein the flat wall provides one face of a rectangular-shaped cooling cavity. The rectangular-shaped cooling cavity can include rounded corners.

The lid of the cooler device can include a fan device configured to mix air within the cooling cavity.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A cooling apparatus comprising:
a lower assembly including a cooling cavity configured to contain an item placed within said cooling cavity, the cooling cavity comprising side walls and a floor wall, wherein one wall of the side walls or the floor wall comprises a wall cavity;
a lid configured to seal the cooling cavity; and
a cooling element removably fixed within said wall cavity, said cooling element comprising an insulated housing containing an insulation integral to said insulated housing, a second cavity formed from said insulated housing, a coolant contained within said second cavity, and a thermally conductive plate for covering said second cavity, wherein said insulated housing substantially restricts thermodynamic communication of said cooling element between the insulated housing and an exterior to the cooling apparatus, and
wherein said thermally conductive plate comprises a metal plate wall portion configured to be exposed to the cooling cavity when the cooling element is affixed within the wall cavity.

2. The apparatus of claim 1, wherein the wall cavity is formed in one of the side walls.

3. The apparatus of claim 1, wherein the wall cavity is formed in the floor wall.

4. The apparatus of claim 1, further comprising a plurality of removable cooling elements, each configured to be removably fixed within a matching wall cavity in one of the side walls or the floor wall.

5. The apparatus of claim 1, wherein the cooling cavity comprises four side walls; and further comprises five removable cooling elements, each configured to be removably fixed within a matching wall cavity in the side walls and the floor wall.

6. The apparatus of claim 1, wherein the cooling element further comprises insulation covering at least one side of the removable cooling element.

7. The apparatus of claim 1, wherein a first one of the removable cooling element and the lower cooler assembly comprises a groove; and wherein a second one of the removable cooling element and the cooler lower assembly comprises a flange, wherein a combination of the flange and the groove removably affix the cooling element within the wall cavity.

8. The apparatus of claim 1, wherein the cooling element further comprises an insulating case covering said insulated housing.

9. The apparatus of claim 1, wherein said insulated housing comprises a material selected from plastic, rubber, glass fill, and mixtures thereof.

10. The apparatus of claim 1, wherein the lid comprises a fan device configured to mix air within the cooling cavity.

11. The apparatus of claim 10, wherein the fan device comprises a solar panel.

12. The apparatus of claim 1, further comprising an inert removable cooling element enabling a user to control a temperature of a canned drink within the cooler device.

\* \* \* \* \*